Sept. 7, 1954     R. J. HOLZINGER ET AL     2,688,246
THERMOSTAT TESTER
Filed June 5, 1952
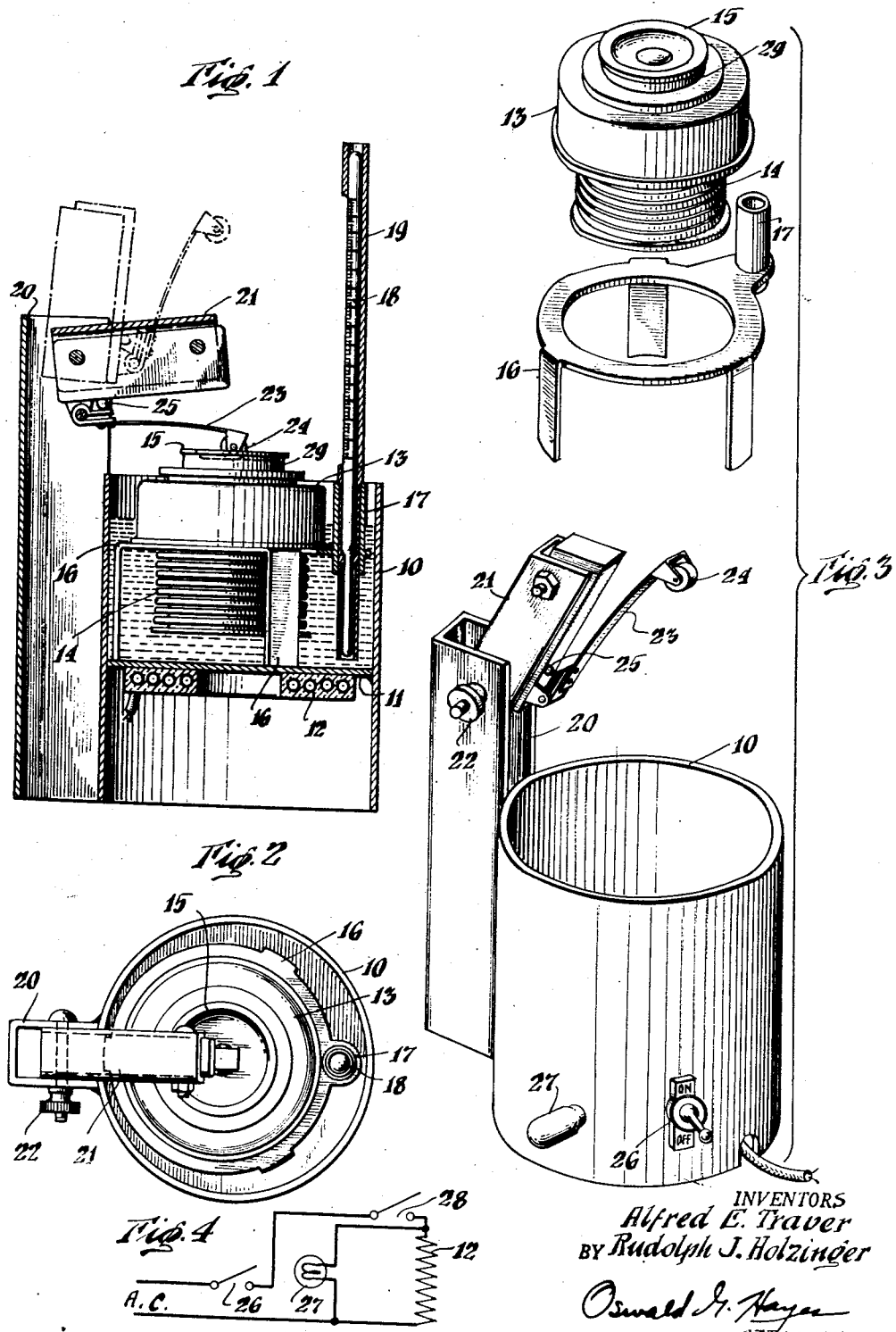

Patented Sept. 7, 1954

2,688,246

UNITED STATES PATENT OFFICE 2,688,246

THERMOSTAT TESTER

Rudolph J. Holzinger, North Merrick, and Alfred E. Traver, Great Neck, N. Y., assignors to Socony-Vacuum Oil Company, Incorporated, a corporation of New York Application June 5, 1952, Serial No. 291,902

3 Claims. (Cl. 73—1)

This invention relates to a device for testing automotive thermostats to determine the temperature at which they operate. The invention is particularly concerned with the provision of a novel automatic tester which is safe in use and accurate.

Modern automobiles are provided with a thermostatic control in the cooling system to prevent circulation of cooling water through the circuit including the engine block and radiator until the water has achieved a predetermined temperature corresponding to efficient operation of the engine. The thermostats so used permit more rapid warmup of the engine and result in economies in consumption of motor fuel and lubricant.

The thermostats in general use are provided with a thermally sensitive element, such as a bellows or bimetallic element, which operates to move a valve from its seat in the body of the thermostatic control when the water in which the thermally sensitive element is immersed achieves the desired temperature. Such a thermostat in the water circulation tubes prevents the passage of cooling water through the circuit including water jacket of the engine block and the radiator until the water in the engine block has reached the temperature at which the thermostat valve will open. Efficient operation of the automotive engine obviously depends upon properly calibrated thermostats. It is therefore desirable to check the thermostat periodically during check of the engine.

Several devices for testing automotive thermostats are available on the market at the present time but all are found to have serious shortcomings for general use in service stations and other establishments providing automotive repair and maintenance services.

The thermostat testers previously available provide for exposing the automotive thermostat to a heating medium which may be either air or aqueous solution. The operator visually observes the point at which the automotive thermostat opens and notes the temperature of the heating medium of a suitable thermometer at that time. This means that the operator must remain at the tester and watch the operation of the thermostat during the heating period. Errors are necessarily involved because of the lag in temperature of the thermostat itself as compared with the temperature of the heating medium. This difficulty is particularly important where air is used since gases are extremely poor heat transfer media.

Most of the presently available thermostat testers using aqueous heat transfer agents utilize a salt solution in which electrodes are immersed. The heating rate is dependent upon the concentration of salt in the solution, from which it follows that the error due to lag between the thermostat and the heating medium will vary with the amount of salt added to the water. Such testers also involve a hazard in the possibility of electric shock on contact with the salt solution.

This invention contemplates the provision of a thermostat tester which is entirely automatic in operation. It is a principal object of the invention to provide a thermostat tester in which a liquid heating medium will be held at the temperature at which the thermostat reacts. By this means, the operator is able to make accurate readings because the system reaches a state of equilibrium with the heating medium and the thermostat at the same temperature. An additional and outstanding advantage is that the operator can place the tester in operation and go about his other duties, returning at his convenience to take a reading.

These and other objects of the invention are accomplished by the use of the novel tester shown in the annexed drawings wherein:

Figure 1 is a view in vertical section of the tester with a thermostat under test in place;

Figure 2 is a plan view of the same assembly as that shown in Figure 1;

Figure 3 is an exploded view illustrating the relationship of the tester, thermostat and tripod support for the thermostat and a thermometer; and Figure 4 is a circuit diagram of the electrical circuit employed in the novel tester of this invention.

Referring particularly to Figure 1, the tester comprises a vessel defined by a circular side wall 10 and a bottom 11 to which is affixed an electric heating coil 12. The vessel is adapted to contain a body of liquid heat transfer medium of which water is the most convenient and readily available. The tester is shown as applied to a bellows type thermostat.

An automotive thermostat indicated generally at 13 and including a bellows 14 which operates a valve 15 is supported in the vessel by a tripod ring support 16. The support 16 carries a cylinder 17 in which may be mounted a thermometer 18. Preferably the thermometer 18 is of the type enclosed in a metallic sheath 19 having an opening along one side through which the thermometer may be read.

Mounted on the wall 10 is a vertical support 20 which carries an arm 21 pivoted in the manner shown and adapted to be held at any desired angle by means of a friction contact against the support 20 and which can be locked in any position by the thumb screw 22.

On the underside of the arm 21 is a resilient strip 23 hinged at its inner end and carrying at its outer end a roller follower 24. A switch of any desired type is mounted in the arm 21 for actuation upon movement of the strip 23 in response to the follower 24. Preferably the switch is of the "micro-switch" type which responds upon very slight movement of its elements. In the embodiment shown, the switch is actuated by movement of a pin 25 which contacts the reverted end of the resilient strip 23.

It is preferable that the tester be provided with a main control switch 26 and a light, such as a neon bulb 27, to indicate when the heater 12 is operating. The general arrangement of these circuit elements is illustrated in Figure 4, which shows the heater 12 in series with the main switch 26 and a switch 28 which is the switch in arm 24 actuated by pin 25. The light 27 is in parallel with the heater 12.

In operation of the device, an automotive thermostat is placed in the tripod ring support 16, a suitable thermometer is supported in cylinder 17 and the assembly is then placed in the body of water inside the test vessel. Arm 21 is then lowered until the roller 24 is in contact with the valve 15 of the automotive thermostat. The micro-switch is normally closed, opening upon movement of pin 25. The arm is therefore lowered until contact is made between pin 25 and the reverted end of strip 23, but no farther. When the switch 26 is closed, heat is applied to the heat transfer medium in the tester and the temperature is raised until the valve 15 opens by being raised away from its seat against collar 29. Roller 24 is forced upwardly, pressing against pin 25 and thus opening the circuit. The system cools when heat is no longer applied by the heater 12, causing thermostat valve 15 to again close and thus close the switch 28 by actuation through roller follower 24, strip 23 and pin 25. The heating and cooling cycle continues with the system being maintained at the temperature at which the thermostat opens until the operator comes around to read the thermometer and open switch 26.

It is to be noted that the ring support 16 permits full submergence of the thermostat bellows without the same being in metal-to-metal contact with the heated bottom. Necessarily therefore, the bellows will be at the same temperature as the bath, eliminating an important source of error encountered in testers where the thermostat rests on the bottom.

We claim:

1. In a tester for a thermostat adapted for use in the cooling system of an automotive engine and having a cylindrical body with a temperature responsive valve member at one end thereof adapted to move axially of the body on change in temperature, the combination which comprises an open vessel defined by side and bottom walls adapted to contain a liquid heat transfer medium, temperature indicating means arranged and adapted to indicate the temperature of liquid heat transfer medium so contained, means to support said thermostat, valve member uppermost, within said vessel in spaced relation to the walls thereof, an electric heater associated with said vessel arranged and adapted to apply heat to said walls, an arm pivotally supported above said vessel for rotation about a horizontal axis to operative position above said means, a follower resiliently carried by said arm and adapted, when the arm is in operative position, to engage the valve member of said thermostat supported in said vessel, and a normally closed electric switch in series with said heater mounted on said arm adjacent said follower for actuation responsive to movement of said follower.

2. In a tester for a thermostat adapted for use in the cooling system of an automotive engine and having a cylindrical body with a temperature responsive valve member at one end thereof adapted to move axially of the body on change in temperature, the combination which comprises an open vessel defined by side and bottom walls adapted to contain a liquid heat transfer medium, temperature indicating means arranged and adapted to indicate the temperature of liquid heat transfer medium so contained, means to support said thermostat valve member uppermost within said vessel in spaced relation to the walls thereof, an electric heater associated with said vessel arranged and adapted to apply heat to said walls, an arm pivotally supported above said vessel for movement to operative position above said means, a follower resiliently carried by said arm and adapted, when the arm is in operative position, to engage the valve member of said thermostat supported in said vessel, and a normally closed electric switch in series with said heater mounted on said arm adjacent said follower for actuation responsive to movement of said follower.

3. In a tester for a thermostat adapted for use in the cooling system of an automotive engine and having a cylindrical body with a temperature responsive valve member at one end thereof adapted to move axially of the body on change in temperature, the combination which comprises an open vessel defined by side and bottom walls adapted to contain a liquid heat transfer medium, temperature indicating means arranged and adapted to indicate the temperature of liquid heat transfer medium so contained, means to support said thermostat valve member uppermost within said vessel in spaced relation to the walls thereof, an electric heater associated with said vessel arranged and adapted to apply heat to said walls, an arm pivotally supported above said vessel for movement to operative position above said means, a follower resiliently carried by said arm and adapted, when the arm is in operative position, to engage the valve member of said thermostat supported in said vessel, a normally closed electric switch in series with said heater mounted on said arm adjacent said follower for actuation responsive to movement of said follower, and a second, manually operable switch in series with said heater and said normally closed switch.

References Cited in the file of this patent

UNITED STATES PATENTS

| Number | Name | Date |
| --- | --- | --- |
| 1,397,766 | Lidberg | Nov. 22, 1921 |
| 2,044,573 | Hornberger | June 16, 1936 |
| 2,095,355 | Cate | Oct. 12, 1937 |
| 2,227,938 | Krebs | Jan. 7, 1941 |
| 2,474,825 | Camilli | July 5, 1949 |
| 2,612,368 | Ransome | Sept. 30, 1952 |